United States Patent
Yoshida et al.

(10) Patent No.: US 12,442,559 B2
(45) Date of Patent: Oct. 14, 2025

(54) HOT WATER SUPPLIER MONITORING SYSTEM

(71) Applicant: NORITZ CORPORATION, Hyogo (JP)

(72) Inventors: Naoya Yoshida, Hyogo (JP); Toshihiko Hamagami, Hyogo (JP); Kazuhiro Nishimura, Hyogo (JP); Hisataka Hayase, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 581 days.

(21) Appl. No.: 17/940,008

(22) Filed: Sep. 8, 2022

(65) Prior Publication Data

US 2023/0085869 A1   Mar. 23, 2023

(30) Foreign Application Priority Data

Sep. 21, 2021   (JP) .................... 2021-153398

(51) Int. Cl.
*F24H 15/104*    (2022.01)
*F24H 9/25*    (2022.01)
(Continued)

(52) U.S. Cl.
CPC ............ *F24H 15/104* (2022.01); *F24H 9/25* (2022.01); *F24H 15/262* (2022.01);
(Continued)

(58) Field of Classification Search
CPC ............ G05B 2223/04; G05B 2223/06; F24H 15/104; F24H 9/25; F24H 15/262; F24H 15/269; F24H 15/296; F24H 15/457
See application file for complete search history.

(56) References Cited

U.S. PATENT DOCUMENTS

2001/0003171 A1* 6/2001 Sakamoto ............... G01K 1/02
                                                     702/132
2020/0004231 A1* 1/2020 Anderson ............... F24H 15/36

FOREIGN PATENT DOCUMENTS

JP    H06214835       8/1994
JP    2002149865      5/2002
(Continued)

OTHER PUBLICATIONS

JP-3978127-B2 translation (Year: 2007).*

*Primary Examiner* — Steven S Anderson, II
*Assistant Examiner* — Kurt Wolford
(74) *Attorney, Agent, or Firm* — JCIPRNET

(57) ABSTRACT

A hot water supplier monitoring system includes a monitoring server monitoring hot water suppliers via a communication network. The hot water supplier supplies hot water by adjusting temperature of hot water heated by a heat exchange unit using combustion heat from combustion operation. The monitoring server accumulates operation data of combustion operation transmitted from the suppliers, and predicts and notifies malfunction occurrence for each supplier based on trend of change in the data over time. The data includes number of flame quenchings of the combustion unit in combustion operation. The monitoring server divides the suppliers into groups according to installation areas, compares the number of quenchings of same period among the groups, compares with previous number of quenchings of same group, and, for a specific group determined having an abnormal number of quenchings, excludes the data determined having an abnormal number of quenchings and predicts malfunction occurrence for each supplier.

2 Claims, 6 Drawing Sheets

(51) Int. Cl.
 *F24H 15/262* (2022.01)
 *F24H 15/269* (2022.01)
 *F24H 15/296* (2022.01)
 *F24H 15/457* (2022.01)
(52) U.S. Cl.
 CPC ......... *F24H 15/269* (2022.01); *F24H 15/296* (2022.01); *F24H 15/457* (2022.01); *G05B 2223/04* (2018.08); *G05B 2223/06* (2018.08)

(56) References Cited

FOREIGN PATENT DOCUMENTS

| | | | |
|---|---|---|---|
| JP | 3978127 B2 | * | 9/2007 |
| JP | 2020052709 | | 4/2020 |
| WO | WO-2020037367 A1 | * | 2/2020 |

* cited by examiner

| Group | Group average value of the number of flame quenchings | Last group average value of the number of flame quenchings |
|---|---|---|
| G 1 | 1.2 | 1.0 |
| G 2 | 0.9 | 0.9 |
| G 3 | 11.3 | 1.1 |
| G 4 | 0.6 | 0.7 |
| ⋮ | ⋮ | ⋮ |

FIG. 7

| Group | Air temperature [°C] | Humidity [%] | Wind speed [m/s] | Wind direction |
|---|---|---|---|---|
| G 3 | 14.6 | 82 | 21.2 | Northwest |

FIG. 8

HOT WATER SUPPLIER MONITORING SYSTEM

CROSS-REFERENCE TO RELATED APPLICATION

This application climates the priority benefits of Japanese application no. 2021-153398, filed on Sep. 21, 2021. The entity of the above-mentioned patent application is incorporated by reference herein and made a part of this specialization.

BACKGROUND

Technical Field

The disclosure relates to a hot water supplier monitoring system that remotely monitors multiple hot water suppliers, and more particularly to a hot water supplier monitoring system that predicts and notifies occurrence of a malfunction based on operation data of each hot water supplier.

Related Art

Hot water suppliers that supply hot water heated by using combustion heat from burning fuel in a combustion unit have been widely used. Such hot water suppliers are equipped with a combustion fan, a fuel supply unit for supplying combustion air to the combustion unit, a heat exchange unit, and the like, and these may deteriorate over time, eventually leading to malfunctions.

The situation where hot water cannot be supplied due to a malfunction of the hot water supplier is undesirable because it is inconvenient for ordinary households, and there also a demand to prevent the situation where hot water cannot be supplied when the hot water supplier is used in business purposes. Therefore, for example, there is known a hot water supplier monitoring system that remotely monitors multiple hot water suppliers via the Internet (communication network) and prepares for parts replacement in advance, as shown in Patent Literature 1.

Since the usage of the hot water suppliers differs from one heater to another, the deterioration status of parts also differs for each hot water supplier. Therefore, in order to determine when to replace parts for each hot water supplier, for example, there is known an assessment device configured to calculate the life expectancy period based on the performance values of the hot water supplier during operation and to prompt parts replacement or the like, as shown in Patent Literature 2. Further, as in Patent Literature 3, a technology is known in which a central processing unit accumulates error information on multiple devices via a communication line and predicts a time of failure for each device based on the deterioration characteristics, operating time, and the like of each device stored in advance.

CITATION LIST

Patent Literature

[Patent Literature 1] Japanese Patent No. 2020-52709
[Patent Literature 2] Japanese Patent No. 2002-149865
[Patent Literature 3] Japanese Patent No. 6-214835

Problems to be Solved

As in the above patent literatures 1 to 3, when multiple hot water suppliers are monitored by a hot water supplier monitoring system and the occurrence of malfunction for each hot water supplier is predicted, the operation data for each hot water supplier is accumulated and prediction is made based on the trend of change in the operation data over time. However, for example, the operation data for each hot water supplier may include abnormalities such as temporary operation errors, performance fluctuations caused by external factors such as weather and infrastructure effects, which hinder the improvement of prediction accuracy for occurrence of malfunctions.

An object of the disclosure is to provide a hot water supplier monitoring system capable of predicting the occurrence of malfunctions for each hot water supplier by excluding the influence of external factors.

SUMMARY

Means for Solving the Problems

In a hot water supplier monitoring system according to technical solution 1, the hot water supplier monitoring system includes a monitoring server for monitoring a plurality of hot water suppliers via a communication network. The hot water supplier includes a combustion unit; a fuel supply unit for supplying fuel to the combustion unit; a combustion fan for supplying combustion air to the combustion unit; an ignition device of the combustion unit; a heat exchange unit; and a control unit for controlling a hot water supply operation in which hot water is supplied by adjusting temperature of hot water heated by the heat exchange unit using combustion heat by burning fuel in the combustion unit by combustion operation. The monitoring server accumulates operation data of the combustion operation periodically transmitted from the plurality of hot water suppliers via the communication network, and predicts and notifies occurrence of malfunction for each hot water supplier based on trend of change in the operation data over time. The operation data includes a number of flame quenchings of the combustion unit in the combustion operation. The monitoring server divides the plurality of hot water suppliers into a plurality of groups according to installation areas, compares the number of flame quenchings of a same period among the plurality of groups and compares them with a previous one of the number of flame quenchings of the same group, excludes the operation data determined as having an abnormality in the number of flame quenchings for a specific group determined as having an abnormality in the number of flame quenchings, and performs malfunction occurrence prediction for each hot water supplier.

In the hot water supplier monitoring system of the disclosure of technical solution 2 according to the disclosure of technical solution 1, when it is determined that, among weather information of a corresponding period in an installation area of the specific group acquired via the communication network, at least wind speed and air temperature do not meet a normal usage condition of the hot water supplier, the monitoring server excludes the operation data determined as having an abnormality in the number of flame quenchings from the malfunction occurrence prediction for each of the hot water suppliers.

BRIEF DESCRIPTION OF THE DRAWINGS

FIG. 7 is a comparative example of group average value of the number of flame quenchings.

FIG. 8 is an example of weather data in an installation area of a specific group.

DESCRIPTION OF THE EMBODIMENTS

Hereinafter, modes for implementing the disclosure will be described with reference to embodiments.

EMBODIMENTS

Figure 1:
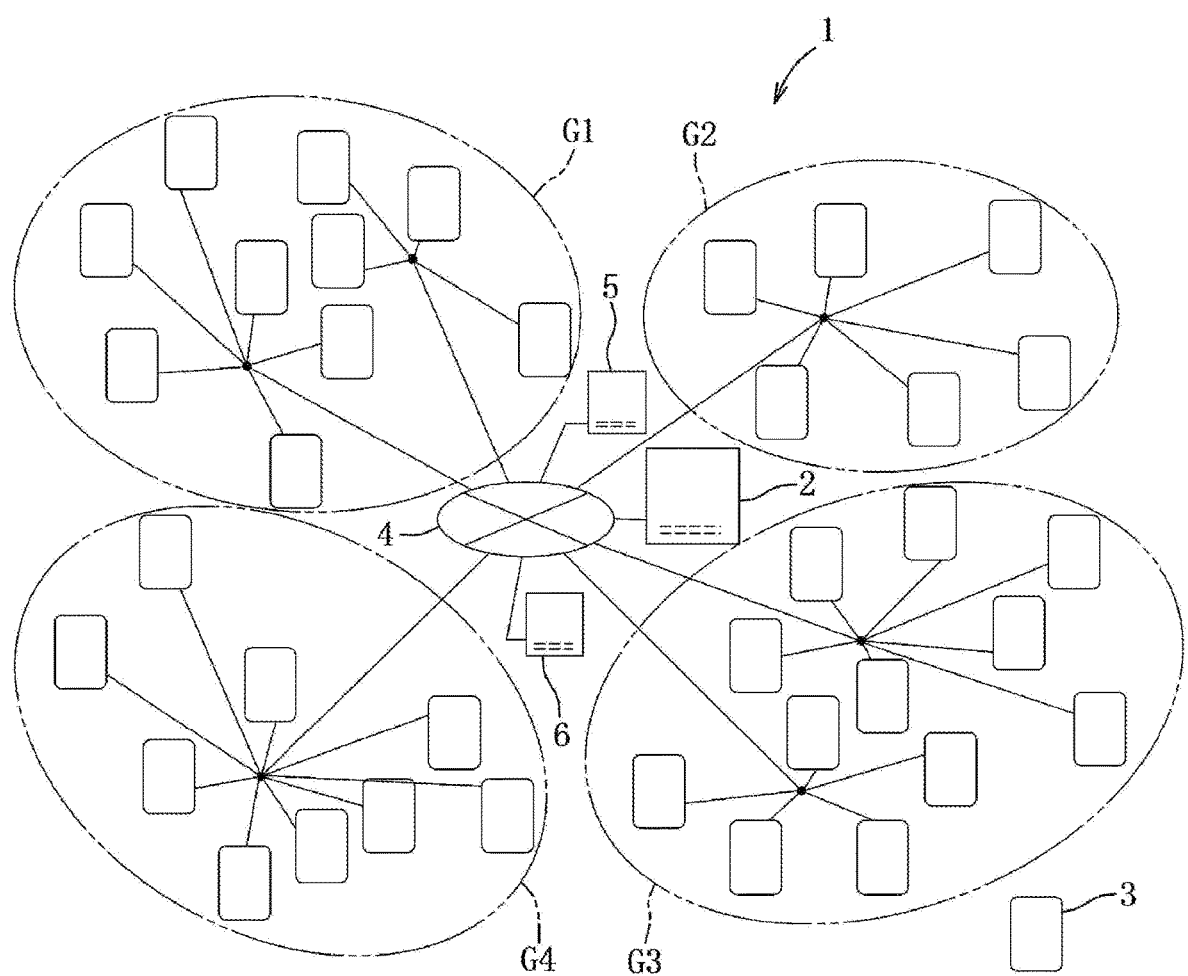
FIG. 1 is an explanatory diagram of a hot water supplier monitoring system according to an embodiment of the disclosure.

As shown in FIG. 1, a hot water supplier monitoring system 1 is configured such that a monitoring server 2 and multiple hot water suppliers 3 are respectively connected to a communication network 4 (for example, the Internet or a communication network for monitoring), and the monitoring server 2 monitors the multiple hot water suppliers 3 via the communication network 4. A weather information server 5 for providing weather information and a fuel information server 6 for providing information on fuel supply for gas pipe work or the like are connected to the communication network 4.

The monitoring server 2 is a computer for information processing having an arithmetic unit, a storage device, and the like, and divides the multiple hot water suppliers 3 to be monitored into multiple groups, such as groups G1-G4, according the installation area. The range of the installation area that the monitoring server 2 divides into multiple groups is, for example, a range at an intermediate level between a prefectural level and a municipal level, but it may also be a range at the prefectural level, the municipal level, or narrower. Further, the number of groups and the number of hot water suppliers 3 belonging to the groups shown in FIG. 1 are examples and are not limited thereto.

Figure 2:
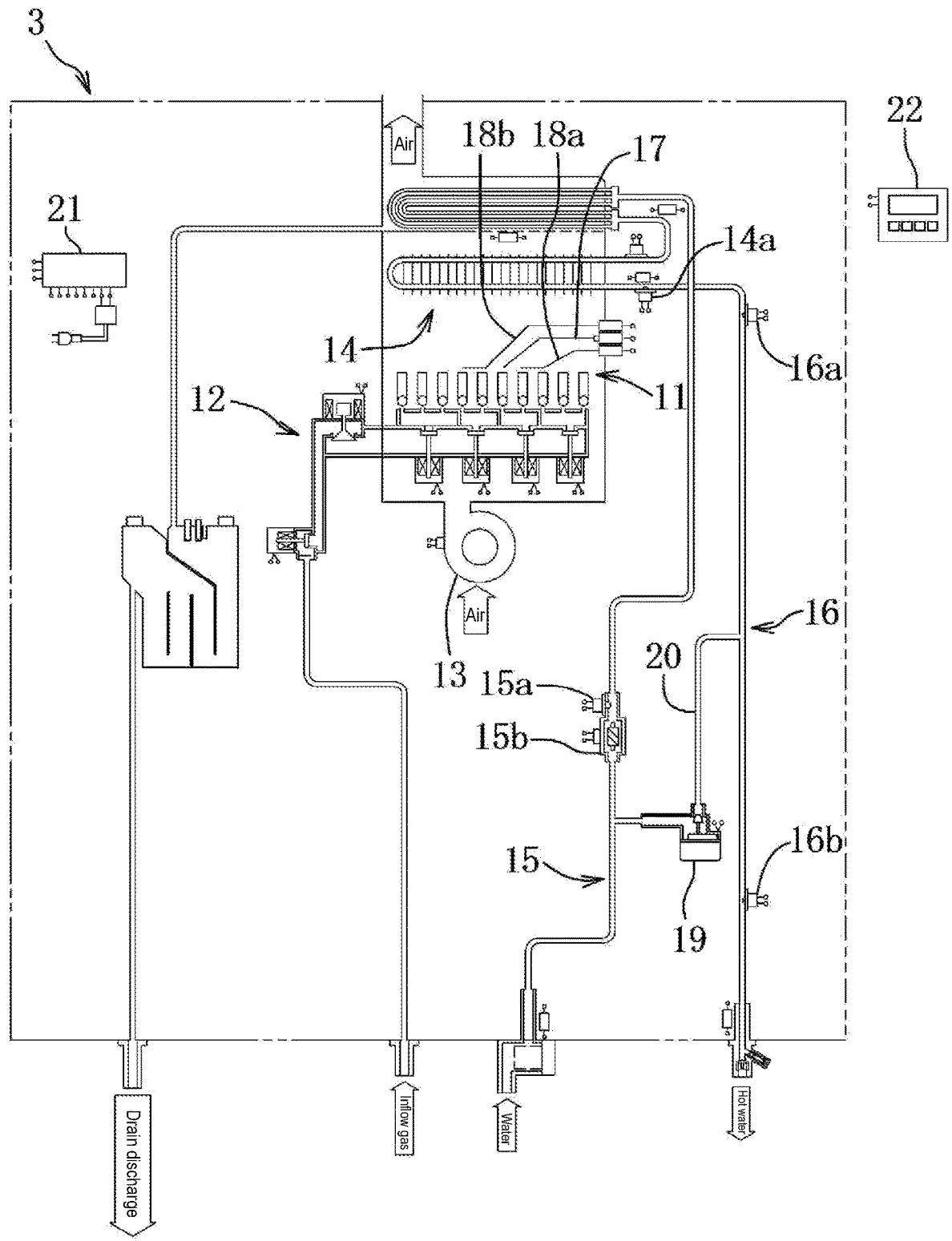
FIG. 2 is an explanatory diagram of the hot water supplier of FIG. 1.

For combustion operation, a hot water supplier 3 includes a combustion unit 11, a fuel supply unit 12 for supplying fuel to the combustion unit 11, and a combustion fan 13 for supplying combustion air to the combustion unit 11, as shown in FIG. 2. Moreover, in order to supply hot water by using the combustion heat from combustion operation, a heat exchange unit 14, a water supply unit 15, and a hot water tapping unit 16 are provided. Near the combustion unit 11, for example, an ignition device 17 (igniter) for discharging and igniting the combustion unit 11 as well as flame rods 18a and 18b for detecting the flame of the combustion unit 11 by a current flowing through the flame are provided. Near the heat exchange unit 14, a can body temperature sensor 14a for detecting the temperature of the can body surrounding the heat exchange unit 14 is provided.

The water supply unit 15 includes a water supply temperature sensor 15a for detecting the temperature (water supply temperature) of the tap water supplied to the heat exchange unit 14, and a flow rate sensor 15b for detecting a flow rate of the tap water. The heat exchange unit 14 heats the tap water supplied from the water supply unit 15 by using the combustion heat of the combustion unit 11 the combustion operation. The hot water tapping unit 16 includes a first hot water tapping temperature sensor 16a for detecting the temperature of the hot water heated by the heat exchange unit 14, and a second hot water tapping temperature sensor 16b. By mixing the hop water heated by the heat exchange unit 14 with tap water from the water supply unit 15 via a bypass passage 20 which includes a flow rate regulating valve 19, the hot water is supplied by adjusting the temperature such that the hot water tapping temperature detected by the second hot water tapping temperature sensor 16b becomes a target hot water tapping temperature.

The hot water supplier 3 includes a control unit 21, which, based on detection signals of the water supply temperature sensor 15a, the flow rate sensor 15b, and the first and second hot water tapping temperature sensors 16a and 16b, adjusts the driving the flow rate regulating valve 19 and the combustion capacity of the combustion operation and controls the hot water supply operation in which the hot water is supplied such that the hot water heated by the heat exchange unit 14 is adjusted to the target hot water tapping temperature. An operation terminal 22 (hot water supply remote controller) for setting the target hot water tapping temperature and the like is connected to the control unit 21. The operation terminal 22 is usually installed at a position close to a hot water tap, and the user may set the target hot water tapping temperature.

For example, when the hot water tap is opened and the flow rate sensor 15b detects a flow rate equal to or higher than a predetermined value, the control unit 21 drives the combustion fan 13, supplies fuel from the fuel supply unit 12 to the combustion unit 11, operates the ignition device 17 to ignite the combustion unit 11, and starts the hot water supply operation. When the flow rate sensor 15b no longer detects a flow rate equal to or higher than the predetermined value, the fuel supply is stopped to end the combustion operation, and after scavenging in a flame-quenched state, the combustion fan 13 is stopped to end the hot water supply operation.

Figure 3:
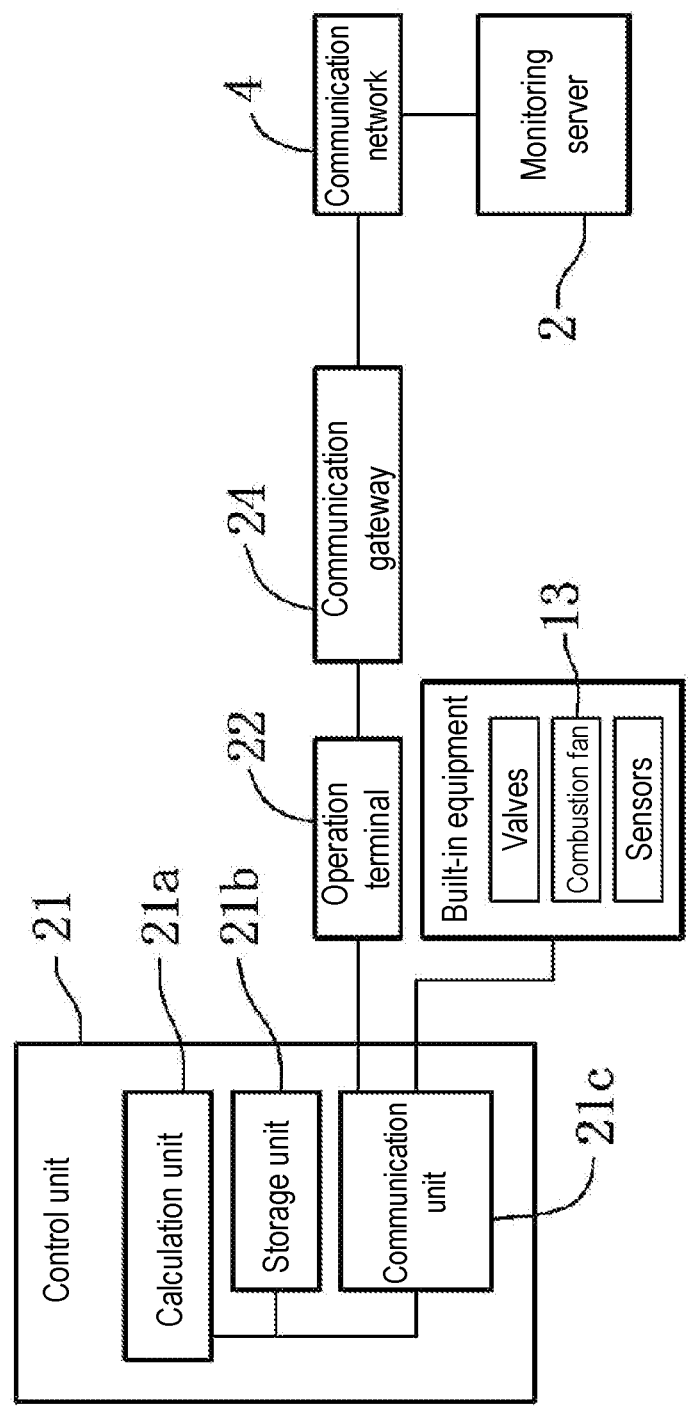
FIG. 3 is an explanatory diagram of a communication connection between a control unit of a hot water supplier and a communication network.

As shown in FIG. 3, the control unit 21 includes a calculation unit 21a for executing various control programs, a storage unit 21b for storing various control programs, control parameters, operation data, and the like, and a communication unit 21c. The calculation unit 21a controls the flow rate regulating valve 19 and valves of the fuel supply unit 12, and the combustion fan 13 via the communication unit 21c that communicates with built-in equipment of the hot water supplier 3 and the operation terminal 22, and receives detection signals from sensors such as the water supply temperature sensor 15a and the flame rods 18a and 18b, and operation details of the operation terminal 22.

The operation terminal 22 is connected to the communication network 4 via a communication device 24 (communication gateway) having, for example, a home network function. The calculation unit 21a executes a control program stored in the storage unit 21b to control the hot water supply operation and collect operation data. The collected operation data is periodically transmitted to the monitoring server 2 every specified period (such as every 6 hours) via the communication unit 21c, the operation terminal 22, and the communication device 24.

Figures 4, 5:
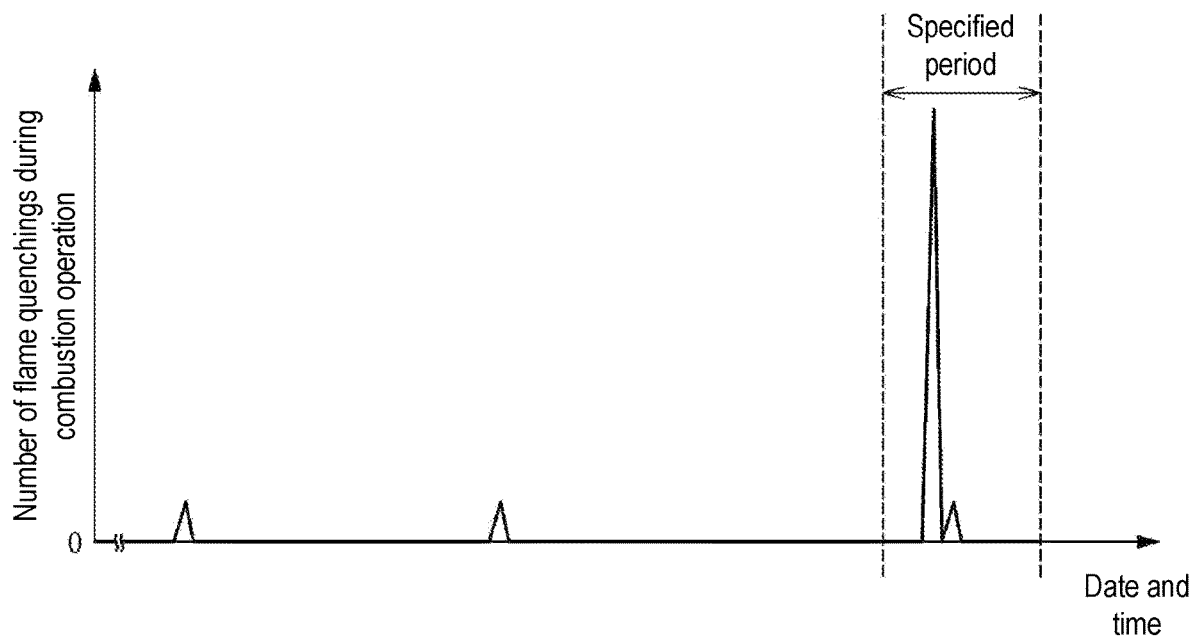
FIG. 4 is an example of operation data transmitted to an external server for each hot water supplier.
FIG. 5 is an example of data of number of flame quenchings during combustion operation of one hot water supplier.

As shown in FIG. 4, the operation data includes basic data such as date and time, inflow water temperature, and hot water tapping temperature; performance data of each part such as rotation number and drive current of the combustion fan 13, and the can body temperature of the heat exchange unit 14; and error data related to malfunctions during operation such as the number of ignition retries of the ignition device 17 and the number of flame quenchings during combustion operation of the combustion unit 11.

The monitoring server 2 receives operation data periodically transmitted respectively from the multiple monitored hot water suppliers 3, and accumulates the same for each hot water supplier 3. Then, it analyzes the operation data accumulated for each hot water supplier 3, predicts the occurrence of a malfunction for each hot water supplier 3 based on the trend of change over time, and notifies this prediction to the corresponding hot water supplier 3 via the communication network 4. For example, regarding the ignition device 17, when the number of ignition retries before the start of combustion due to adhesion of soot or the like tends to increase over time, the monitoring server 2 predicts the time when a preset upper limit number of times is reached, and notifies to prompt the maintenance of the ignition device 17 when the predicted time is approached.

Further, for example, when the drive current of the combustion fan 13 tends to increase over time with respect to a constant combustion fan rotation number, the monitoring server 2 predicts and notifies the time when the drive current becomes unacceptable. For example, when the heat exchange of the heat exchange unit 14 is hindered by the adhesion of soot and scale, and the temperature of the can body tends to increase as the temperature of the combustion gas flowing through the heat exchange unit 14 increases, the monitoring server 2 may also predict and notify the time when the allowable limit of the performance deterioration of the heat exchange unit 14 is reached.

The operation data includes not only the tendency of deterioration of the hot water supplier 3 over time, but also the influence of the weather such as wind speed and air temperature, and the influence of the infrastructure related to the fuel supply to each hot water supplier 3. For example, as shown in FIG. 5, the number of flame quenchings of the combustion unit 11 during the combustion operation is stored in correspondence with the date and time. Moreover, in a most recent specified period, the number of flame quenchings of the combustion unit 11 is significantly increased due to, for example, backflow of outside air due to a strong wind. In this specified period, in addition to the increase in the number of flame quenchings, the influence of the weather (strong wind) such as the increase in the drive current of the combustion fan 13 is recorded. Although not shown, when there is an influence of the fuel supply infrastructure, increase in the number of ignition retries and the number of flame quenchings are recorded. When the air temperature is extremely high or extremely low, malfunction of built-in equipment, erroneous detection of the sensor, or the like may occur. The influence of external factors such as weather and infrastructure reduces the accuracy of predicting occurrence of malfunctions in the hot water supplier 3 based on operation data.

Here, the influence of external factors is often recorded in the operation data the same period in multiple hot water suppliers 3 installed within a range equal to or higher than the municipal level, for example. Therefore, the monitoring server 2 determines the presence or absence of the influence of an external factor by comparing the operation data the same period among multiple groups in which the multiple hot water suppliers 3 to be monitored are divided according to installation areas (see FIG. 1).

When the monitoring server 2 determines that there is an influence of an external factor, it performs malfunction occurrence prediction in each hot water supplier 3 without using the operation data affected by the influence. Exclusion of the influence of external factors in this malfunction occurrence prediction will be described based on the flowchart of FIG. 6 by taking as an example the case where the number of flame quenchings of the combustion unit 11 in the operation data is abnormally increased due to strong wind as the influence of the weather. Si (i=1, 2, . . . ) in the drawing represents a step.

The monitoring server 2 starts malfunction occurrence prediction when the operation data of the multiple hot water suppliers 3 to be monitored of the most recent specified period are collected. First, in S1, the group average value of the number of flame quenchings in a specified period of each group is calculated (step of calculating group representative value), and the process proceeds to S2. Since the number of hot water suppliers 3 differs for each group, and the operating status and usage period of the multiple hot water suppliers 3 in one group also vary, in order to reduce the bias due to the number of heaters, operating status, and usage period, operation data representing the group is calculated. Here, the average value of the number of flame quenchings in a specified period of the group is calculated and used as the operation data of the same period to be compared between the multiple groups. The operation data representing the group may be a median value or may be calculated by another statistical method.

Next, in S2, the group average value of the number of flame quenchings in a specified period is compared between the multiple groups, and compared with the last (previous) group average value of the same group (step of comparing group average value), and the process proceeds to S3. For example, as shown in FIG. 7, the group average value of the number of flame quenchings in a specified period of the group G3 is significantly higher than that of other groups, and is greatly increased compared to the last group average value of the group G3.

Figure 6:
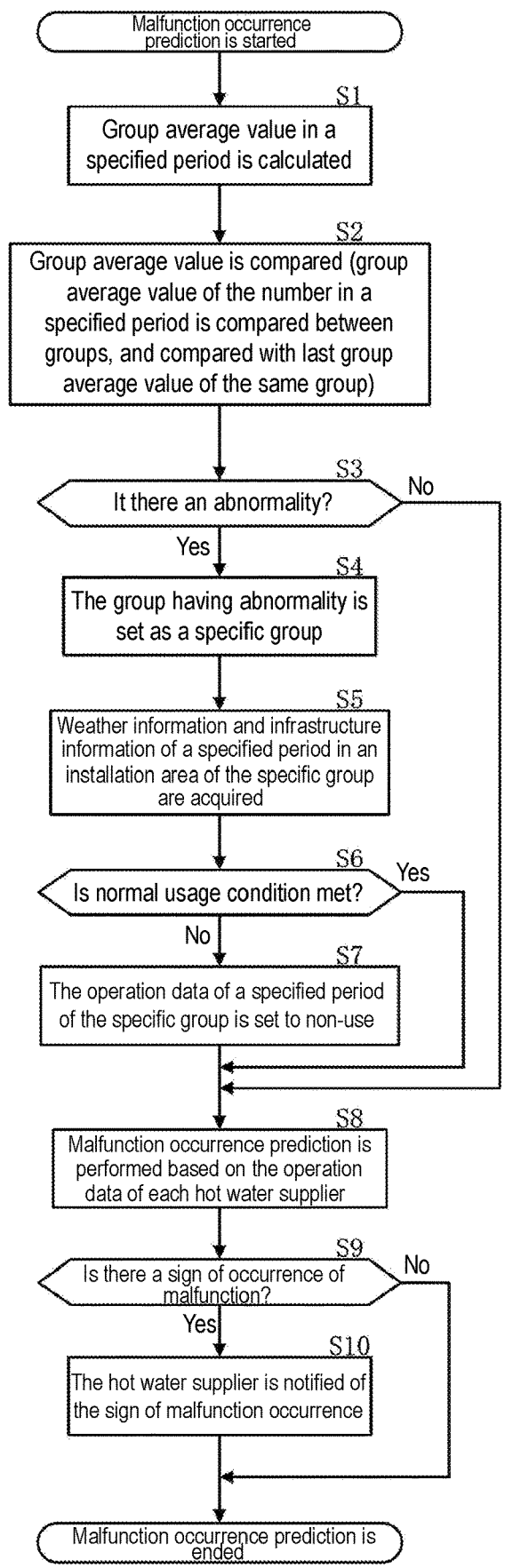
FIG. 6 is a flowchart of malfunction occurrence prediction.

In S3 of FIG. 6, it is determined whether or not there is an abnormality in the group average value of the number of flame quenchings in a specified period (step of determining abnormal group). For example, as a criterion for determination, there is a group that is a times (for example, 5 times) or more the group average value of other groups, when the group average value of the group is a times or more compared to the last time, it is determined that there is an abnormality. If there is an abnormality in the group average value of the number of flame quenchings in a specified period and it is determined Yes in S3, the process proceeds to S4. The group having the abnormality in S4 (here, the group G3) is set as a specific group (step of setting specific group), and the process proceeds to S5.

In S5, the weather information and infrastructure information of a specified period in the installation area of the specific group are acquired (step of acquiring external factors), and the process proceeds to S6. For example, as shown in FIG. 8, the acquired weather information includes at least wind speed and air temperature.

In S6 of FIG. 6, based on the acquired weather information and infrastructure information, it is determined whether or not the combustion operation of the multiple hot water suppliers 3 belonging to the specific group within a specified period meets a predetermined normal usage condition (step of determining usage condition). In the normal usage condition, usage condition including the wind speed and the air temperature are defined in order to use the hot water supplier 3 safely. If the normal usage condition is not met, it means that the number of flame quenchings is abnormal due to external factors such as the weather, not due to a malfunction of the hot water supplier 3.

If the normal usage condition is not met and it is determined No in S6, the process proceeds to S7. Then, in S7, the operation data of a specified period of the specific group is set to non-use for malfunction occurrence prediction (step of setting non-use of abnormal data), and the process proceeds to S8. Further, if it meets the normal usage condition and it is determined Yes in S6, the process proceeds to S8. On the other hand, if there is no abnormality in the group average value of the number of flame quenchings in the specified period and it is determined No in S3, the process also proceeds to S8.

In S8, for the multiple hot water suppliers 3 monitored by the monitoring server 2, malfunction occurrence prediction is performed based on the accumulated operation data of each hot water supplier 3 (step of predicting malfunction), and the process proceeds to S9. At this time, the operation data of the specified period of the specific group set to non-use in S7 is excluded from the subsequent malfunction occurrence prediction and is not used for malfunction occurrence prediction. Therefore, for the multiple hot water suppliers 3 belonging to the specific group (the group G3), the monitoring server 2 performs malfunction occurrence prediction for each hot water supplier 3 based on remaining operation data after excluding the operation data of a specified period influenced by external factors.

Next, in S9, it is determined for each hot water supplier 3 whether or not there is a sign of occurrence of a malfunction (step of determining malfunction occurrence). If it is determined by malfunction occurrence prediction that there is the sign and it is determined Yes in S9 is Yes, the process proceeds to S10, and in S6, the corresponding hot water supplier 3 is notified of the sign (prediction result) of the malfunction occurrence (step of notifying prediction result), and malfunction occurrence prediction is ended. If it is determined No in S9 is No, malfunction occurrence prediction is ended as it is. In this manner, the hot water supplier monitoring system 1 excludes the operation data affected by external factors and performs malfunction occurrence prediction for each hot water supplier 3, such that the accuracy of predicting the occurrence of a malfunction is improved.

The operation and effect of the above-mentioned hot water supplier monitoring system 1 is described hereinafter.

In the hot water supplier monitoring system 1, operation data transmitted from the multiple hot water suppliers 3 is accumulated in the monitoring server 2, and the monitoring server 2 predicts and notifies the occurrence of a malfunction for each hot water supplier 3 based on the trend of change in the accumulated operation data over time. At this time, the monitoring server 2 divides the multiple hot water suppliers 3 into multiple groups according to installation areas, compares the number of flame quenchings of the combustion unit 11 included in the operation data of the same period among the multiple groups and compares them with the previous number of flame quenchings in the same group, and sets a specific group having an abnormality in the number of flame quenchings. Then, for this specific group, the occurrence of a malfunction is predicted for each hot water supplier 3 by excluding the operation data having an abnormality in the number of flame quenchings.

The abnormality in the number of flame quenchings in the specific group is not caused by the multiple hot water suppliers 3 belonging to the specific group, but is due to the influence of external factors. Therefore, for the multiple hot water suppliers 3 belonging to a specific group, the hot water supplier monitoring system 1 may exclude the operation data affected by external factors, and predicts and notifies the occurrence of a malfunction in each hot water supplier 3 based on operation data not affected by external factors, which can improve the accuracy of predicting the occurrence of a malfunction.

Moreover, in the installation area of the specific group, the hot water supplier monitoring system 1 determines that an abnormality has occurred in the number of flame quenchings due to at least the wind speed and air temperature not meeting the normal usage condition of the hot water supplier 3, excludes the operation data determined as having an abnormality in the number of flame quenchings, and predicts and notifies the occurrence of a malfunction for each hot water supplier 3. Therefore, by excluding the operation data that are determined as having abnormalities due to external factors related to the weather, including at least wind speed and air temperature, the hot water supplier monitoring system 1 can predict and notify the occurrence of a malfunction in each hot water supplier 3 based on that operation data not affected by external factors.

When it is determined that there is influence of weather, division into multiple groups may be performed by the monitoring server 2 according to the range of the acquired weather data. Further, when it is determined that there is influence of infrastructure, division into multiple groups may be performed by the monitoring server 2 according to, for example, the fuel supply range as the maintenance range of the infrastructure. Further, a person having ordinary skill in the art can implement the embodiments in a form in which various modifications are added to the above embodiment without departing from the spirit of the disclosure, and the disclosure includes such modifications.

According to the above configuration, in the hot water supplier monitoring system, the monitoring server accumulates the operation data periodically transmitted from the plurality of hot water suppliers, and predicts and notifies the occurrence of malfunction for each hot water supplier based on the trend of change in the operation data over time. At this time, the monitoring server divides the plurality of hot water suppliers into plurality of groups according to installation areas, compares the number of flame quenchings of a same period of the combustion unit included in the operation data among the plurality of groups and compares them with a previous one of the number of flame quenchings of same group, excludes the operation having an abnormality in the number of flame quenchings for a specific group having an abnormality in the number of flame quenchings, and predicts the occurrence of malfunction for each of the hot water suppliers. The abnormality in the number of flame quenchings in the specific group is not caused by the plurality of hot water suppliers belonging to this specific group, but is due to the influence of external factors. Therefore, by excluding the operation data affected by external factors for the plurality of hot water suppliers belonging to a specific group by the hot water supplier monitoring system, it is possible to predict the occurrence of malfunction for each hot water supplier based on the operation data not affected by external factors, which can improve the prediction accuracy of the occurrence of malfunction.

According to the above configuration, in the installation area of the specific group, it is determined that there is an abnormality in the number of flame quenchings due to the wind speed and air temperature not meeting the normal usage condition of the hot water supplier, and the malfunction occurrence is performed for each hot water supplier by excluding the operation data determined as having an abnormality in the number of flame quenchings. Therefore, by excluding the operation data determined as having abnormality caused by external factors related to the weather, including at least wind speed and air temperature, it is possible to predict the occurrence of malfunction for each hot water supplier based on the operation data not affected by external factors.

Effects

According to the hot water supplier monitoring system of the disclosure, it is possible to predict the occurrence of malfunction for each hot water supplier while excluding the influence of external factors, and improve the prediction accuracy of the occurrence of malfunction.

What is claimed is:

1. A hot water supplier monitoring system, comprising a monitoring server for monitoring a plurality of hot water suppliers via a communication network, wherein the hot water supplier comprises a combustion unit; a fuel supply unit for supplying fuel to the combustion unit; a combustion fan for supplying combustion air to the combustion unit; an ignition device of the combustion unit; a heat exchange unit; and a control unit for controlling a hot water supply operation in which hot water is supplied by adjusting temperature of hot water heated by the heat exchange unit using combustion heat by burning fuel in the combustion unit by combustion operation, and the monitoring server accumulates operation data of the combustion operation transmitted from the plurality of hot water suppliers via the communication network, and predicts and notifies occurrence of malfunction for each hot water supplier based on trend of change over time in the operation data, wherein the operation data comprises a number of flame quenchings of the combustion unit in the combustion operation, and the monitoring server divides the plurality of hot water suppliers into a plurality of groups according to installation areas, compares a group average value of the number of flame quenchings of a same period among the plurality of groups and compares a group average value of the number of flame quenchings of a specific group with a previous group average value of the number of flame quenchings of the specific group, determines whether or not there is an abnormality in the group average value of the number of flame quenchings of the specific group based on results of the comparisons, and determines whether or not the combustion operation of the hot water suppliers belonging to the specific group meet a normal usage condition of the hot water suppliers based on weather information and infrastructure information in an installation area of the specific group, wherein when it is determined that the normal usage condition of the hot water supplier is not met, the monitoring server excludes the operation data of the specific group determined as having an abnormality in the group average value of the number of flame quenchings from malfunction occurrence prediction for a specific group determined as having an abnormality in the number of flame quenchings, and performs the malfunction occurrence prediction for each hot water supplier based on remaining operation data after excluding the operation data of the specific group determined as having an abnormality in the group average value of the number of flame quenchings.

2. The hot water supplier monitoring system according to claim 1, wherein when it is determined that, among the weather information of a corresponding period in the installation area of the specific group acquired via the communication network, at least wind speed and air temperature do not meet the normal usage condition of the hot water supplier, the monitoring server excludes the operation data of the specific group determined as having an abnormality in the group average value of the number of flame quenchings from the malfunction occurrence prediction for each of the hot water suppliers.

* * * * *